United States Patent [19]
Zirnheld et al.

[11] Patent Number: 5,291,174
[45] Date of Patent: Mar. 1, 1994

[54] CERAMIC SUBSTRATE BLOWER MOTOR RESISTOR ARRAY

[75] Inventors: Richard A. Zirnheld; Ronald J. Goubeaux, both of Lockport, N.Y.

[73] Assignee: General Motors Corporation, Detroit, Mich.

[21] Appl. No.: 13,526

[22] Filed: Feb. 4, 1993

[51] Int. Cl.$^5$ .................. H01C 7/10; H01C 13/00; H01C 1/012
[52] U.S. Cl. .................. 338/24; 338/50; 338/51; 338/295; 338/308
[58] Field of Search .................. 338/24-49, 338/50-51, 295, 307, 308, 328, 220, 235, 260, 254; 361/24

[56] References Cited

U.S. PATENT DOCUMENTS

| | | | |
|---|---|---|---|
| 4,342,020 | 7/1982 | Utner et al. | 338/314 |
| 4,408,244 | 10/1983 | Weible | 361/24 |
| 4,935,717 | 6/1990 | Osawa et al. | 338/51 |
| 5,000,662 | 3/1991 | Yamamoto et al. | 417/32 |
| 5,218,336 | 6/1993 | Murakami | 338/328 |

Primary Examiner—Marvin M. Lateef
Attorney, Agent, or Firm—Mark A. Navarre

[57] ABSTRACT

An improved blower motor speed control resistor array in which the resistor elements are defined by multiple optimally sized patches of resistive ink deposited onto opposite sides of a thin flat ceramic substrate. The array comprises three resistive patches connected in series via fusing elements to provide three reduced blower motor speeds MH, M and L. The thin ceramic substrate is flat on both of its faces, and each face comprises a terminal region for attachment of the resistive patches to the terminal elements, and a resistor region for deposition of the three resistive patches. The resistive patch of lowest resistivity (the MH resistor) is deposited on the entire resistor region of a first side of the substrate. The resistor patches of intermediate and highest resistivity (the M and L resistors, respectively) share the resistor region of the other side of the substrate in relation proportion to their respective resistivities.

4 Claims, 3 Drawing Sheets

CERAMIC SUBSTRATE BLOWER MOTOR RESISTOR ARRAY

This invention relates to an automotive blower motor speed control resistor array, and more particularly, to an array of printed resistors disposed on a ceramic substrate adapted to be mounted in the air stream of the blower.

BACKGROUND OF THE INVENTION

In automotive blower motor installations, several discrete blower speeds are customarily achieved through the use of various resistor elements connected in series with the blower motor via a multi-position speed control switch. In such installations, the resistor elements may be formed in an array on a support structure disposed in the inlet or discharge air path of the blower to dissipate heat generated by the passage of motor current through the resistor elements. The resistor elements may be discrete (wire-wound, for example) or printed in an array on a substrate in the manner of a printed circuit board. In the U.S. Patent to Yamamoto et al. 5,000,662, for example, the resistors are defined by a serpentine pattern of resistive material deposited on a porcelain enameled metallic substrate.

A fundamental engineering trade-off occurs in the design of a resistor array due to conflicting cost, heat transfer and packaging considerations. For packaging considerations, the resistor array should be as small as possible. This also tends to minimize noise and airflow restriction in the air duct. For heat transfer considerations, the array should be designed to maximize heat rejection. In addition to materials selection, this consideration impacts the package size and shape since heat rejection increases with increasing surface area. Of course, cost considerations tend to dictate against the use of exotic materials and complex manufacturing processes.

The current design philosophy in blower motor resistor arrays is to incorporate a metallic element into the array in order to provide adequate heat rejection while keeping the size of the array reasonably small. In Yamamoto et al., for example, porcelain enamel coating is deposited over a metal substrate. In other designs, a metallic fin is attached to the array. These designs may satisfy heat transfer and packaging considerations, but adversely impact cost considerations.

SUMMARY OF THE PRESENT INVENTION

The present invention is directed to an improved blower motor speed control resistor array in which the resistor elements are defined by multiple optimally sized patches of resistive material deposited onto both front and back sides of a thin, flat ceramic substrate.

In the preferred embodiment, the array comprises three resistive patches connected in series via fusing elements, thereby providing three reduced blower motor speeds, referred to herein as medium-high (MH), medium (M), and low (L). Terminal elements connect one end of the array to the motor, and a selector switch selectively connects none, one, two or three of the resistive patches in the motor current path.

Both front and back faces of the substrate have a terminal region for electrically coupling the resistive patches to the terminal elements, and a resistor region for deposition of the three resistive patches. The resistive patch of lowest resistivity (the MH resistor) is deposited on the entire resistor region of a first side of the substrate. The resistor patches of intermediate and highest resistivity (the M and L resistors, respectively) share the resistor region of the other side of the substrate in relation to their respective resistivities. Electrical connection between resistor patches on the front and back sides of the substrate are advantageously made through a terminal element which contacts conductive terminal pads on both sides of the substrate.

In MH blower operation, only the MH resistor is active. In this case, the motor current and blower speed are relatively high, and heat is rejected from the entire resistor region of the first side of the array. In M blower operation, both the MH and M resistors are active. In this case, the motor current and blower speed are somewhat reduced, and heat is rejected from both the entire resistor region of the first side and a portion of the resistor region of the second side. In L blower operation, all three resistors are active. In this case, the motor current and blower speed are relatively low, and heat is rejected from the resistor regions of both sides of the array.

In the above manner, the entire available surface of the ceramic substrate is sectored into three resistive patches having areas sized in relation to the maximum expected operating temperatures for each of the three modes, resulting in optimally uniform heat rejection during operation of the blower motor. The uniformity maximizes the heat rejection for a given array size, and minimizes the incidence of hot spots. This permits closer proximity of the array to materials sensitive to elevated temperatures, and therefore simplifies packaging.

According to another aspect of this invention, fuse elements are formed on the substrate for interrupting one or more of the resistor circuit connections if the substrate temperature rises above a predefined threshold. The uniform heat rejection characteristic of the array contributes to consistent and reliable operation of the fuse elements in that the fuse elements are subject to substantially the same thermal conditions as the resistor patches.

The resistor array of this invention is advantageously formed with economical materials and a simple manufacturing process, while the size and placement of the resistive patches optimizes the heat rejection for a given package size, as noted above. The result is a cost effective design having significant package size and heat rejection advantages.

BRIEF DESCRIPTION OF THE DRAWINGS

FIG. 3 depicts a sectional view of the resistor array of FIGS. 2a-2b, taken along lines 3—3 of FIG. 2a.

DETAILED DESCRIPTION OF THE DRAWINGS

Figure 1:
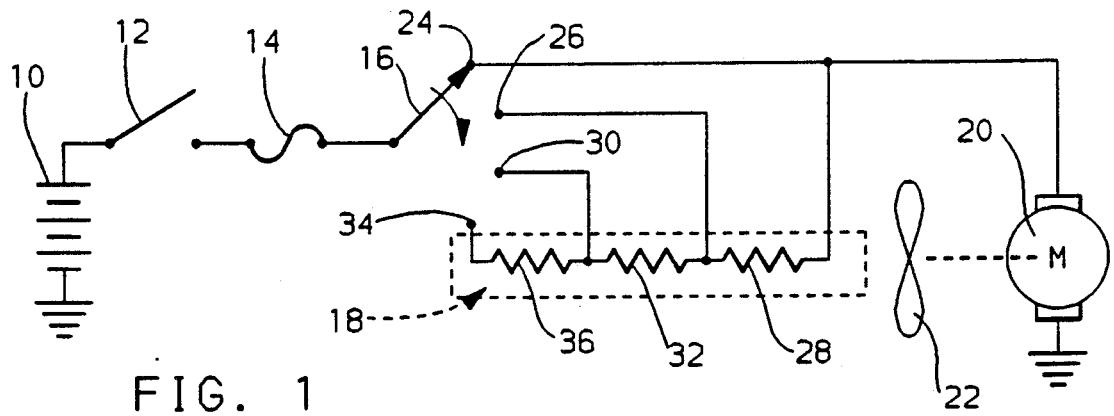
FIG. 1 is an schematic diagram of a conventional automotive blower motor control including a three resistor array for speed control of the blower motor.

FIG. 1 generally depicts a conventional vehicular blower motor control system including a storage battery 10, a key-operated ignition switch 12, a fuse 14, an operator manipulated fan speed selector switch 16, a resistor array 18, a DC fan motor 20 and a motor driven impeller 22. In the illustrated embodiment, the positive terminal of battery 10 is connected to supply current to fan motor 20 via ignition switch 12, fuse 14 and selector switch 16. Alternately, the selector switch may be connected in the low side of the circuit—that is, between motor 20 and the negative terminal of battery 10.

The selector switch 16 is positioned by the operator to control the speed of fan motor 20 by controlling the resistance of the motor current path. When the selector switch engages the contact 24, as depicted in FIG. 1, the battery voltage is directly applied to the fan motor 20 for full speed operation. When the contact 26 is engaged, the current path of fan motor 20 includes the MH resistor 28. When the contact 30 is engaged, the current path of fan motor 20 includes both the MH and M resistors 28 and 32. When the contact 34 is engaged, the current path of fan motor 20 includes the MH, M and L resistors 28, 32 and 36. As the series resistance in the motor current path increases, the current supplied to the motor 20, and hence its speed of rotation, decreases.

As indicated above, the resistor array 18 and impeller 22 are mounted in a blower motor air duct (not shown) so that the air flow produced by rotation of the impeller 22 augments the heat rejection of the array 18. The resistor array of this invention includes integral fusing, as described below, but otherwise is electrically equivalent to the resistor array 18 of FIG. 1.

Figure 2A:
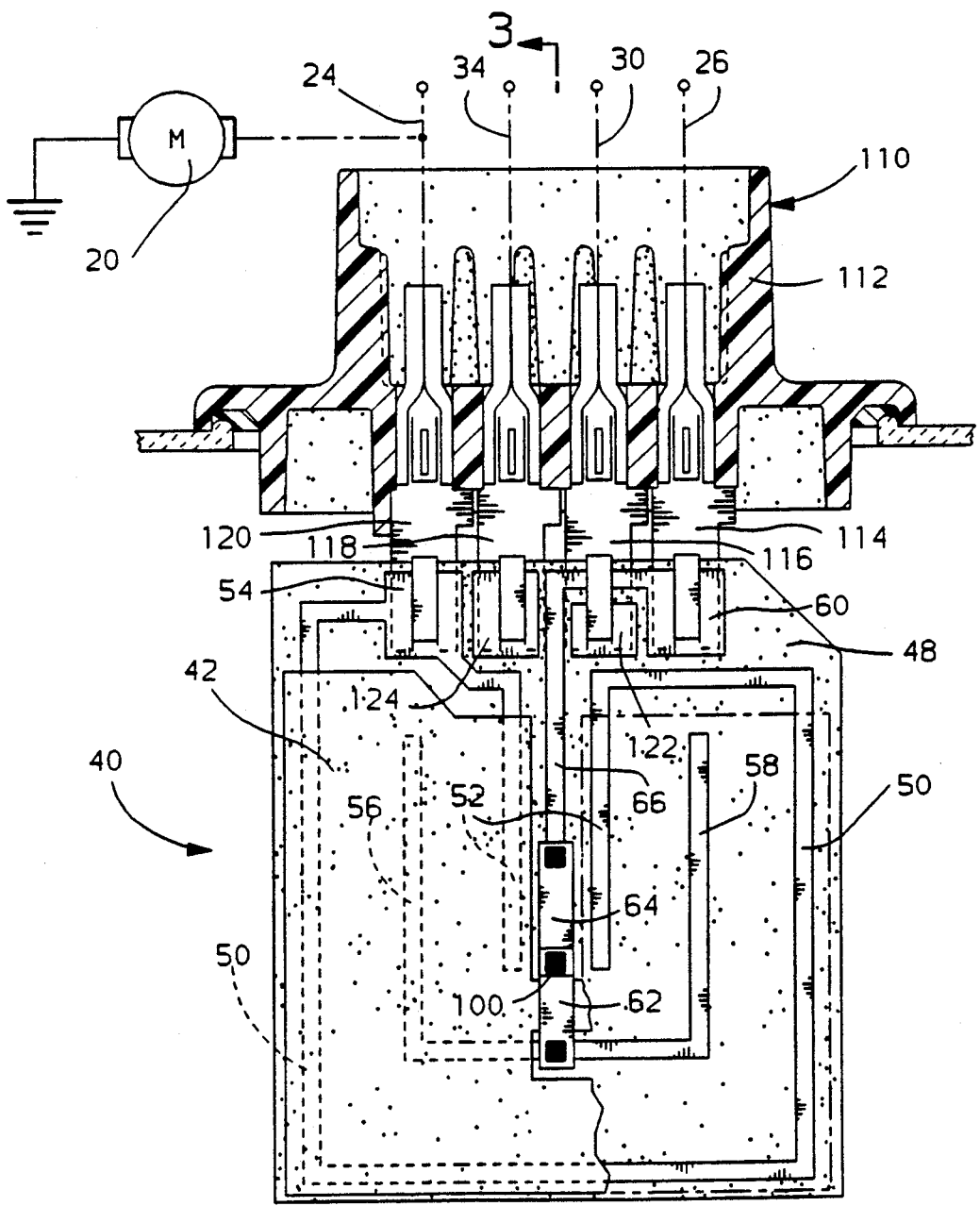
FIGS. 2a-2b depict partial sectional views of the front and back sides, respectively, of a resistor array according to a preferred embodiment of this invention.
Figure 3:
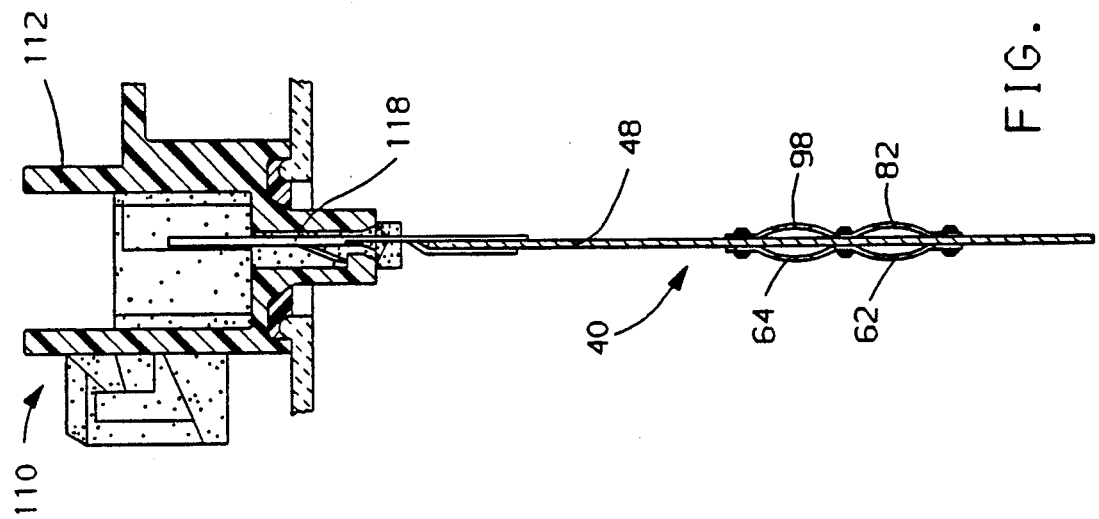
Figure 2B:
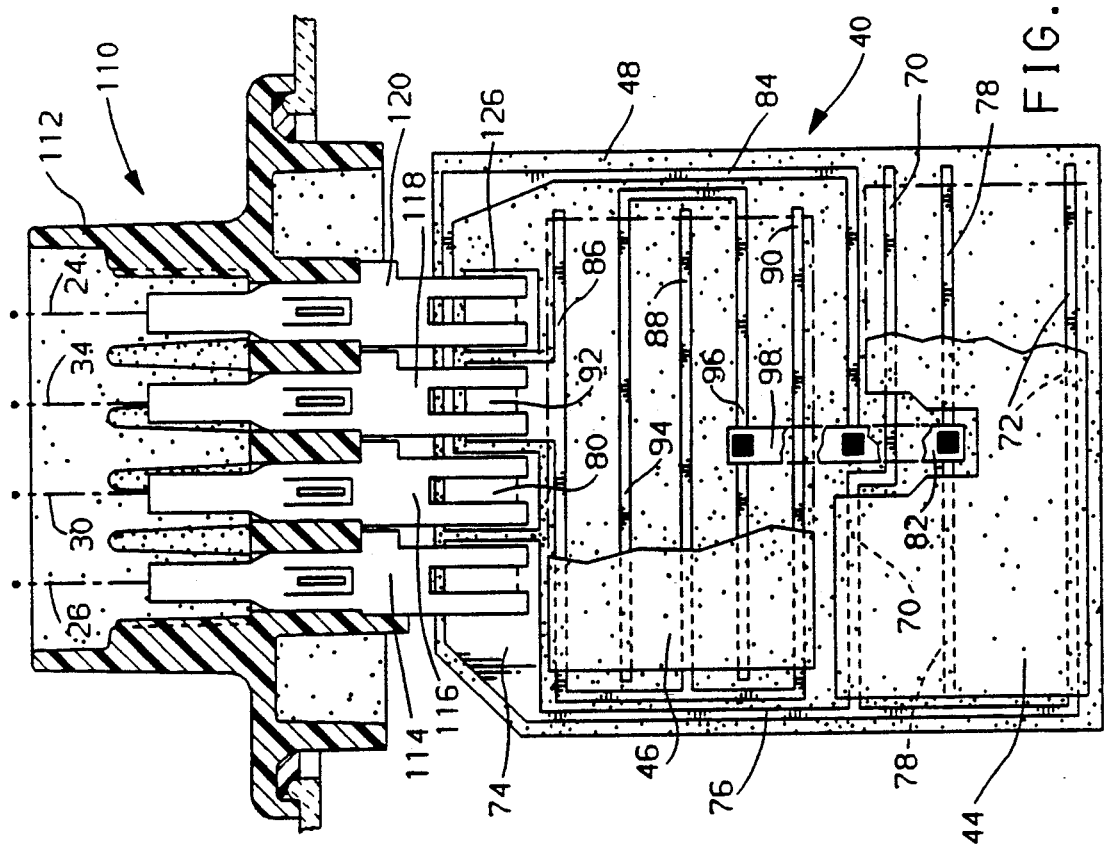

Referring to FIGS. 2a, 2b and 3, the resistor array of this invention is generally designated by the reference numeral 40. The resistor elements 28, 32 and 36 are created by forming three patches 42, 44 and 46 of electrically resistive material directly on a flat ceramic substrate 48. FIG. 2a depicts a first side of the substrate 48, referred to herein as the front side, while FIG. 2b depicts a second side, referred to herein as the back side. A single large surface area patch 42 corresponding to the resistor 28 of FIG. 1 is formed on the front side, as seen in FIG. 2a, and two successively smaller patches 44 and 46 corresponding to the resistors 32 and 36 of FIG. 1 are formed on the back side as seen in FIG. 2b.

The patches 42, 44 and 46 are underlaid by a network of metallic traces which distribute and collect current, such traces being contiguous with a number of metallic pads which facilitate fusing and electrical termination. Referring to FIG. 2a, it is seen that the patch 42 is underlaid by a first set of metallic traces 50, 52 contiguous with a terminal pad 54, and a second set of metallic traces 56, 58 contiguous with terminal pad 60 via fuse elements 62, 64, and metallic trace 66. Referring to FIG. 2b, the patch 44 is similarly underlaid by a first set of metallic traces 70, 72 contiguous with a terminal pad 74 via metallic trace 76, and a second metallic trace 78 contiguous with terminal pad 80 via fuse element 82 and metallic trace 84. The patch 46 is underlaid by a first set of metallic traces 86, 88, 90 contiguous with terminal pad 92, and a second set of metallic traces 94, 96 contiguous with terminal pad 80 via fuse element 98 and metallic trace 84.

As best seen in the sectional view of FIG. 3, the fuse elements 62, 64, 82 and 98 consist of short lengths of metal band, soldered in tension between a pair of metallic traces or pads formed on the substrate 48. The fuse function occurs if the temperature of the substrate 48 or environs rises above the melting point of the solder, whereupon the respective fuse element(s) returns to its pre-tensile state, interrupting the respective resistor connections. Referring to FIG. 2a, the fuse elements 62, 64 are defined by a single metal band soldered to metallic traces 56 and 66, and to an intermediate metallic pad 100. Referring to FIG. 2b, the fuse elements 82 and 98 are defined by a single metal band soldered to metallic traces 78, 84 and 96.

A connector assembly for forming an electrical connection with the resistor elements 28, 32 and 36 is generally designated by the reference numeral 110 in FIGS. 2a-2b and 3. The connector assembly 110 comprises a plastic housing 112 and four clip terminals 114-120 secured therein. As best seen in FIG. 3 in relation to clip terminal 118, the clip terminals 114-120 are formed with integral fingers that contact both sides of the substrate 48. Thus, the clip terminal 114 contacts the terminal pads 60 and 74; the clip terminal 116 contacts the terminal pads 80 and 122; the clip terminal 118 contacts the terminal pads 92 and 124; and the clip terminal 120 contacts the terminal pads 54 and 126.

It is therefore seen that the clip terminals may perform dual functions: interfacing the resistor array 40 to the selector switch 16, and electrically interconnecting the front and back sides of the substrate 48 (via pads 60 and 74) to facilitate series connection of resistors on the front and back sides.

Figure 4:
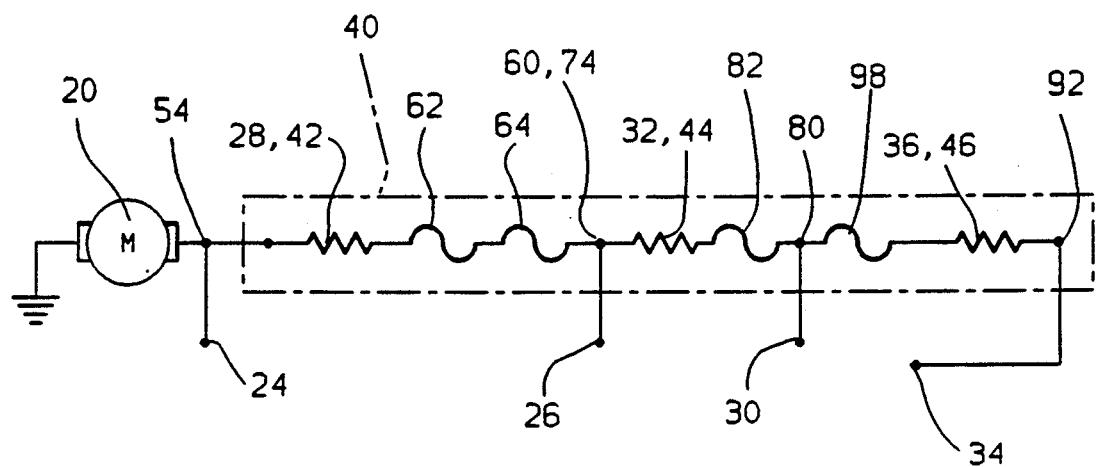
FIG. 4 depicts an equivalent circuit of the resistor array of FIGS. 2a-2b and 3.

The electrical equivalent circuit of the resistor array 40 is depicted in FIG. 4. The resistor element connection points are identified by the reference numerals 54, 60/74, 80 and 92 assigned to the respective terminal pads.

Figure 5:
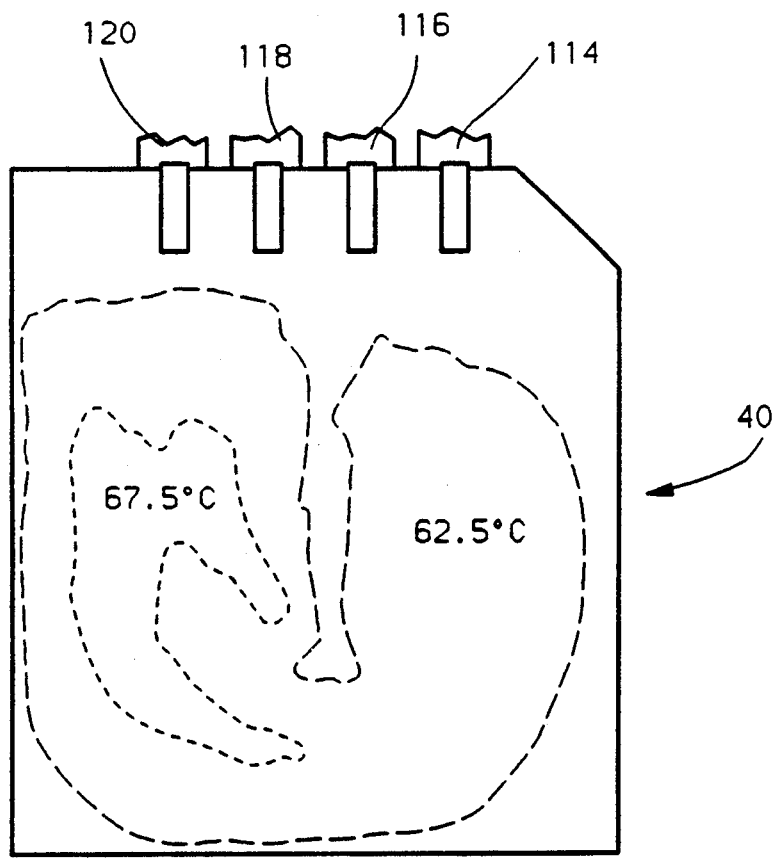
FIG. 5 is a thermal representation of a resistor array according to this invention.

FIG. 5 is a thermal representation of the front side of the resistor array 40 during MH operation of the blower motor 20. Not only is the surface temperature significantly lower than with known metallic processes, but the temperature distribution is much more uniform as well. The uniform temperature distribution and cooler operating temperatures reflect the efficient heat transfer achieved with an array constructed in accordance with this invention. Also, the uniform temperature distribution ensures that the fuse elements 62, 64, 82, 98 and the respective resistor elements 42, 44, 46 operate at substantially the same temperature, contributing to superior circuit protection.

In the manner described above, the resistor array of this invention achieves the motor speed control function while optimizing the heat rejection for a given package size. The result is a cost effective design significant package size and heat rejection advantages. While this invention has been described in reference to the illustrated embodiment, various modifications will occur to those skilled in the art. For example, the M resistor could occupy all of the front side of the substrate, with the L and MH resistors occupying the back side of the substrate. Furthermore, a different fuse design could be employed, or the design could incorporate a different number of resistor patches. In this regard, it should be understood that resistor arrays incorporating these or other modifications may fall within the scope of this invention, which is defined by the appended claims.

The embodiments of the invention in which an exclusive property or privilege is claimed are defined as follows:

1. A speed control resistor for a vehicle blower motor control in which said resistor is electrically connected in a current path of said motor and disposed in an air duct so that airflow produced by rotation of the blower motor dissipates heat generated in said resistor due to conduction of blower motor current therethrough, said resistor comprising:

- a flat ceramic substrate having first and second sides, each side having a resistor region;
- a first resistor adapted for connection in the motor current path to provide a first blower motor speed, said first resistor being defined by a first patch of resistive material disposed on substantially the entire resistor region of the first side of said substrate;
- a second resistor adapted for connection in the motor current path with said first resistor to provide a second blower motor speed, said second resistor being defined by a second patch of resistive material disposed on a first portion of the resistive region of the second side of said substrate; and
- a third resistor adapted for connection in the motor current path with said first and second resistors to provide a third blower motor speed, said third resistor being defined by a third patch of resistive material disposed on a second portion of the resistor region of the second side of said substrate, the second and third portions comprising substantially the entire resistor region of the second side of said substrate.

2. The speed control resistor set forth in claim 1, wherein the first and second sides of the ceramic substrate have terminal regions on which are formed a series of conductive terminal pads, and the resistor includes fusing elements disposed on the first and second sides of the substrate in the resistor regions thereof, such fusing elements being connected in circuit paths electrically coupling said resistors to said terminal pads.

3. A multi-terminal resistor array for a vehicle blower motor control in which a selector switch completes a motor current supply circuit through selected resistors of said array via selective engagement of a supply circuit contact with respective terminals of said array, said resistor array comprising:

- a flat ceramic substrate having first and second sides, each side including a terminal region on which are formed a series of conductive terminal pads and a resistor region on which are formed at least one resistor, each such resistor being defined by a patch of resistive material disposed on a respective side of the substrate, each resistor on each side of the substrate being electrically coupled to a pair of terminal pads formed on such side; and
- a series of terminals electrically coupled to said resistors via said terminal pads, at least one of the terminals including a first contact electrically coupled to a terminal pad formed on the first side of said substrate and a second contact electrically coupled to a terminal pad formed on the second side of said substrate, whereby such terminal defines an electrical bridge between said first and second sides to facilitate series connection of resistors formed on said first and second sides.

4. The resistor array set forth in claim 3, including:
fusing elements disposed on the first and second sides of said substrate in the resistor regions thereof, such fusing elements being connected in circuit paths electrically coupling said resistors to said terminal pads.

* * * * *